United States Patent
Alaweih

(10) Patent No.: US 7,004,697 B2
(45) Date of Patent: Feb. 28, 2006

(54) OUTRIGGER LIFTING DEVICE FOR FUEL TANKERS

(75) Inventor: Adam Alaweih, Dearborn Heights, MI (US)

(73) Assignee: United States of America as represented by the Secretary of the Army, Washington, DC (US)

(*) Notice: Subject to any disclaimer, the term of this patent is extended or adjusted under 35 U.S.C. 154(b) by 859 days.

(21) Appl. No.: 10/113,650

(22) Filed: Mar. 29, 2002

(65) Prior Publication Data

US 2005/0276673 A1    Dec. 15, 2005

(51) Int. Cl.
*B60P 7/08*    (2006.01)

(52) U.S. Cl. .................... 410/68; 410/49; 410/77; 410/120; 410/121; 410/151; 410/156; 294/67.1; 294/68.3

(58) Field of Classification Search .................. 410/46, 410/47, 49–50, 68, 77, 89, 120, 121, 129, 410/151, 156; 294/67.1, 74, 67.33, 68.3, 294/81.54; 280/838
See application file for complete search history.

(56) References Cited

U.S. PATENT DOCUMENTS

| | | | | | |
|---|---|---|---|---|---|
| 2,056,179 | A | * | 10/1936 | Fitch | 410/68 |
| 3,178,044 | A | * | 4/1965 | Phillips | 410/68 |
| 3,420,481 | A | * | 1/1969 | Arnes | 410/46 |
| 4,236,854 | A | * | 12/1980 | Rogers | 410/121 |
| 5,163,726 | A | * | 11/1992 | Boos et al. | 294/81.1 |
| 5,688,086 | A | * | 11/1997 | Menzemer et al. | 410/68 |
| 5,997,228 | A | * | 12/1999 | Potter | 410/155 |
| 6,729,815 | B1 | * | 5/2004 | Hornady | 410/47 |

* cited by examiner

*Primary Examiner*—Stephen Gordon
(74) *Attorney, Agent, or Firm*—David L. Kuhn; Luis Miquel Acosta; Thomas W. Saur

(57) ABSTRACT

A load handling mechanism for use with loaded tankers has two transverse attachment members associated with longitudinal beams supporting the tank structure. Cables and associated spreader bars are attached to the transverse attachment members to provide a single lift point loading means for the tanker allowing loaded tankers to be easily loaded and unloaded in to transport means such as ships.

1 Claim, 2 Drawing Sheets

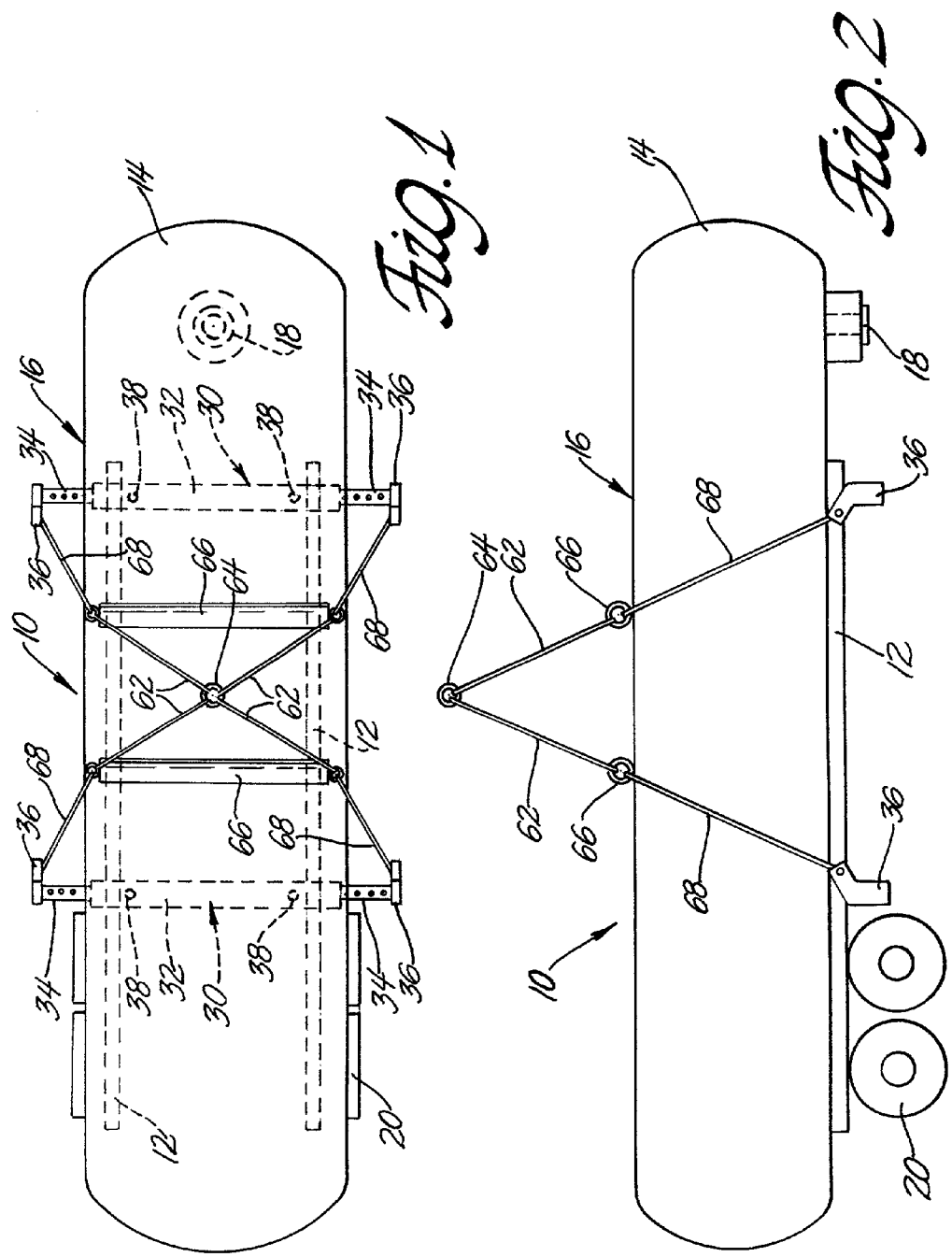

OUTRIGGER LIFTING DEVICE FOR FUEL TANKERS

GOVERNMENT INTEREST

The invention described here may be made, used and licensed by and for governmental purposes without paying me any royalty.

BACKGROUND OF THE INVENTION

In one aspect this invention relates to cargo handling devices. More particularly this invention relates to sling structures useful in loading and unloading ground vehicle fuel tankers from ships.

As part of supplying military deployments it is necessary to provide fuel in large quantities to various locations. The supply chain depends on large, 5,000-gallon, tankers moved using large truck-tractors as the primary means of distributing fuel. The general procedure is to move the empty tankers in ships and unload the tanker at a destination port using a belly band or net configuration. The empty tanker is then filled with fuel and is ready for further transport. The entire unloading and filling operation requires approximately six hours per tanker from start to finish.

Obviously the time spent filling the tanker is lost time to the main mission. Further while the tanker is being filled it represents a vulnerable, stationary target for a substantial period of time making it easily destroyed or sabotaged. A third problem with the present procedure is it requires the transfer of large amounts of liquid hydrocarbons. This creates risk of spillage, hydrocarbon emissions, and fire. The alternative is removing the tanker from the ship in a loaded condition to avoid the transfer of fuel. This procedure when using belly bands or nets creates its own hazards since the loaded tankers are considerably heavier than the empty tanker and if the sling system fails the release of flammable, polluting hydrocarbons would be both large and virtually instantaneous.

It would be desirable from a military point of view to have a tanker unloading system that has the supporting portion of the unloading system as a part of the tanker structure. The system could be used to load and unload filled tankers from ships with a minimized amount of risk.

SUMMARY OF THE INVENTION

The structure of the present invention provides an improved unloading sling and attachment configuration that will allows a fully loaded fuel tanker to be safely lifted as a unit. The unloading structure of this invention has first and second transverse members located beneath and permanently attached to longitudinal rails located on the underside of the reservoir portion of the tanker. The first and second transverse members have an attachment means located on each end. The attachment means are moveable coaxially from a first inboard, shipping position to a second outboard lifting position. The attachment means in the second position extend to a point beyond the tanker for easy attachment of lifting cables. The attachment means have an eye or similar attachment means that allow the transverse members to be attached to the free ends of a four-cable cargo sling structure. The cables are in turn attached at their other end to a single lift ring that can be engaged by a crane hook for loading and unloading the tanker. The cables will have a spreader bar located at a point between the lift ring and the cable end to maintain the cables in a spaced configuration approximating the width of the tanker.

BRIEF DESCRIPTION OF THE DRAWINGS

In the accompanying drawing:

FIG. 1 is; top view of a tanker with a loading system of this invention attached;

FIG. 2 is side view of the system shown in FIG. 1; and

DETAILED DESCRIPTION

Figure 3:
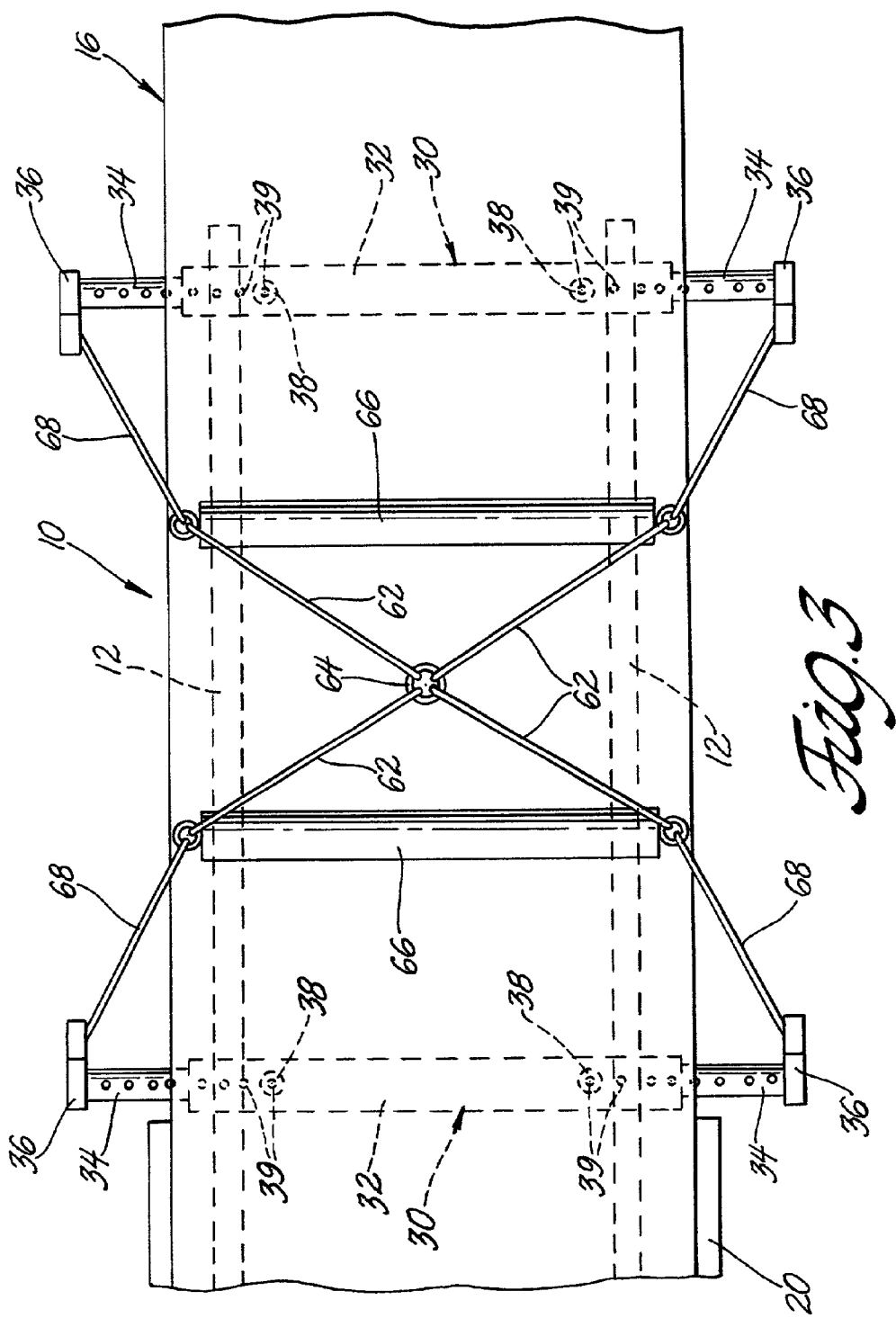
FIG. 3 is top view of the components with the tanker removed.

Referring to the accompanying drawings in which like numerals refer to like parts, FIGS. 1 & 2 shows a load handling structure according to this invention integrated with a fuel tanker. The load handling structure is designated generally 10, and is permanently attached to a pair of supporting members or under carriage longitudinal beams 12 that form the primary supporting structure of a fuel reservoir 14. The fuel reservoir 14 contemplated by this invention is on the order of 5,000 gallons. The longitudinal beams 12 are attached to the fuel reservoir 14 so as to traverse its length. The fuel tanker and ancillary equipment 16 has a kingpin structure 18 attached at one end. The kingpin structure 18 is of normal design and construction for connecting the tanker 16 to a standard truck-tractor, not shown, for transport. A set of wheels 20, shown as a standard dual tire truck configuration, is mounted on the end of the tanker 16 opposite the king pin structure 18 to provide rolling support for the tanker. The wheel attachment, axles, associated brakes and other structure are common in the heavy trucking industry and further discussion is omitted in the interest of brevity.

The tanker 16 has multi-piece transverse members 30 of the lifting structure located near the rear and front portion of the tanker. The transverse members 30 have a hollow center portion 32 that is rigidly fixed to the longitudinal beams 12 such as by welding or other fastening means. Associated with the hollow center portion 32 are two telescoping arms 34 that can be moved into and out of the hollow center portion to vary the length of the overall transverse member 30. Each of the telescoping arms 34 has an attachment bracket 36 on one end of the arm. The other end of each arm 34 is lodged within the hollow member 32 and adapted to move longitudinally within the hollow member to position the bracket 36 with respect to the remainder of the tanker. As shown, the arms 34 are adapted to slide smoothly into and out of the hollow center section and have a plurality of spaced apertures 40 formed therein. The hollow center portion 32 has at least one complimentary aperture 39 located on each end of the center portion. A retention pin 38 can be placed through the aperture 39 in the hollow center portion 32 and desired aperture 40 in the arm 34 to hold the arm at the desired degree of extension with respect to the sides of the tanker.

When readying the fuel tanker or transport, the arms 34 will be moved so the bracket 36 is as close to the frame members 12 as possible. The pin 38 is inserted as above and holds the arms 34 and associated brackets 36 close to the tanker body 14 for safety and transportability. When the tanker is in position to be offloaded, the pin 38 is removed and the arm 34 can then be extended until the brackets 36 are located in a plane outside a vertical plane defined by the tanker wall. When the arms 34 are in their innermost stored position, the brackets 36 the end of the arms provide additional tie down points to hold the tanker 16 securely on a shipping platform or within a ships hold.

Turning to the cables and lifting portion of the apparatus collectively a sling 60, the sling can be divided into upper and lower sections the upper section comprising four lengths of cable 62 joined to a lift ring 64. The lift ring 64 provides a single lift point for the apparatus 10. Near the midpoint of the overall cable structure are two spreader bars 66. Each spreader bar 66 has an attachment point at each end suitable for attaching one of the ends of the upper cables 62 to the spreader bar. The spreader bars 66 serve to keep a set of lower cables 68 away from the sides of the tanker 16 during the offloading procedure. Each of the lower cables 68 has a second end attached to one of the brackets 36 associated with arms 34, the entire structure forming a four-point attachment to the tanker 16 frame members 12 with a single lift point 64. Segmenting the cables at the spreader bars provides cables that have a short length compared to the overall length of the rigging making attachment easier since only the length from the spreader bar to the attachment point needs to be controlled at any one time.

Various alterations and modifications will become apparent to those skilled in the art without departing from the scope and spirit of this invention and it is understood this invention is limited only by the following claims.

What is claimed is:

1. A load handling structure for use with a fuel tanker, the tanker having longitudinal beams supporting a tank structure, the tanker having attachment means for attaching a tractor to the tanker, and wheels located on the opposite end of the tanker from the attachment means, the load handling structure including:
    a first transverse attachment member having a hollow center support permanently attached to the longitudinal beams, a pair of extensible members telescopingly engaged with the center support, each telescoping member having an attachment bracket on one end;
    a second transverse attachment member having a hollow center support permanently attached to the longitudinal beams, a pair of telescoping extensible members engaged with the center support of the second attachment member, each telescoping member of the second attachment member having an attachment bracket on one end;
    a first set of four cables each of the cables having one end attached to a lift ring, and a second end;
    a pair of spreader bars each bar being associated with two of the cables the spreader bar being attached to a respective said second end of the cables;
    a second set of cables, one end of each cable of the second set being attached to a corresponding end of the spreader bars and a second end of each cable of the second set being attached to the attachment means so as to form a lifting mechanism with a single lift point.

* * * * *